United States Patent
Ciccarelli

[15] 3,693,638
[45] Sept. 26, 1972

[54] TOOTH CLEANER

[72] Inventor: Angelo Ciccarelli, 32 North Osprey Avenue, Sarasota, Fla. 33577

[22] Filed: April 12, 1971

[21] Appl. No.: 133,199

[52] U.S. Cl. ............................................. 132/91
[51] Int. Cl. ........................................... A61c 15/00
[58] Field of Search ...................... 132/91, 90, 92

[56] References Cited

UNITED STATES PATENTS

| 1,217,779 | 2/1917 | Kleckner | 132/92 A |
| 2,146,375 | 2/1939 | Landis | 132/92 R |
| 1,733,631 | 10/1929 | Spiegel et al. | 132/92 R |

FOREIGN PATENTS OR APPLICATIONS

| 247,880 | 2/1926 | Great Britain | 132/92 |

*Primary Examiner*—Louis G. Mancene
*Assistant Examiner*—Gregory E. McNeill
*Attorney*—Rohe Meyer

[57] ABSTRACT

The present invention comprises a device for cleaning between and around the teeth of a user which comprises a pair of slightly diverging arms having dental floss confining means at their outer ends and which terminate in a laterally projecting holding projection to be gripped by the thumb and a finger of the user, and to tightly hold the ends of a piece of dental floss which passes through the dental floss holding means at the ends of the arms. The device also includes a stabilizing member which engages the arms and rigidly supports them as well as a suitable guiding element for guiding the ends of the floss into proper relation with the thumb and finger grip.

6 Claims, 3 Drawing Figures

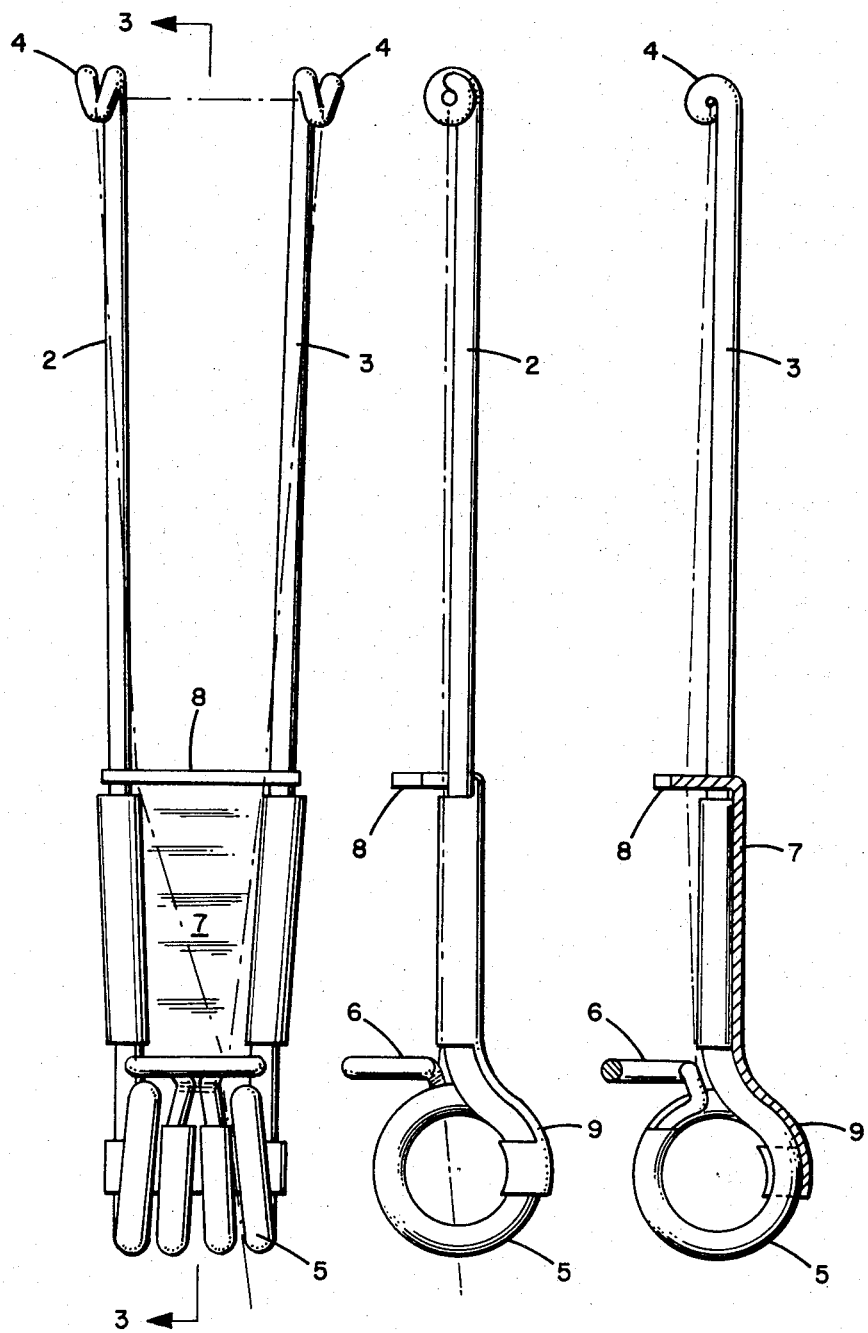

TOOTH CLEANER

This invention relates to a tooth cleaner for holding a length of dental floss rigidly across the space between two arms which have a suitable thumb and finger member connected thereto, as well as dental floss containing means at their ends remote from the thumb and finger projection, thus when a piece of dental floss is threaded through the dental floss engaging means at the ends of the arms and the ends of the piece of floss are securely attached or wound about the thumb and finger engaging projection, a free or open length of the floss extends between the free ends of the arms and is held taut at right angles to the arms for use in cleaning between and about the teeth of the user in free and easy movement between and about the teeth due to the light weight and easy manipulation of the present tooth cleaner.

Many dentists recommend the use of dental floss for cleaning between and about a person's teeth. This floss comes in relatively long lengths, usually wound upon a spool. The user unwinds a length of floss from the spool and winds it around a finger of each hand so as to provide a taut straight length of floss between the fingers and by the use of both hands manipulates the floss between and about his teeth. This is an uncomfortable, awkward, and quite often ineffective use of dental floss for the prescribed purpose, and the primary object of the present invention is to provide a tooth cleaner which will hold a suitable length of dental floss straight and taut, such device being light in weight, comparatively small, and easily manipulated to bring the straight taut length of floss between and about the teeth of the user with the use of the thumb and a finger of one hand.

With these and other objects in view, as may appear from the accompanying specification, the invention consists of various features of construction and combination of parts, which will be first described in connection with the accompanying drawings, showing a Tooth Cleaner of a preferred form embodying the invention and the features forming the invention will be specifically pointed out in the claims.

In the drawings:

FIG. 1 is an enlarged front elevation of the tooth cleaner.

FIG. 2 is an enlarged edge elevation of the tooth cleaner.

FIG. 3 is a longitudinal section through the tooth cleaner taken on the line 3—3.

Referring more particularly to the drawings, the tooth cleaner includes a pair of arms 2 and 3 which as shown in the drawings diverge slightly from parallel relationship towards their upper free ends. Upon the upper free ends of each arm is formed a dental floss restraining eye 4 which has a narrow entrance opening in its perimeter to permit the insertion of dental floss into the eye. The ends of the arms remote from the dental floss restraining eyes are coiled to form a thumb and finger gripping element 5 having flat ends and being substantially circular in cross section. The material of which the arms and thumb and finger grip element is made is further shaped to provide a guiding hook 6 which overlaps the upper part of the thumb and finger grip, the purpose of which will be hereafter more fully described. A steadying or stabilizing plate 7 is provided, which is positioned near the thumb and finger grip 5 has its edges bent to engage the arms 2 and 3 and has a laterally extending arm spreader flange 8 on its upper end to hold the arms 2 and 3 rigidly in their proper positions. A skirt 9 is formed on the lower end of the steadying or stabilizing plate 7 and engages the rear surface of the thumb and finger grip 5 and cooperates with the hook 6 to guide the ends of a length of dental floss about the thumb and finger grip near or against the skirt 9 so as to permit the ends of the floss to be held tightly in place.

In use, a suitable length of dental floss is removed from its spool, broken free from the remaining floss on the spool. One end of this length of dental floss is guided beneath the guide hook 6 and wound about the thumb and finger grip 5 and against the skirt 9. The free length of the dental floss is then wound along one of the arms 2 or 3 on its end, then across and into the retaining eye on the end of the other arm and moved downwardly along the arm and wound about the thumb and finger grip 5 pulling the length of dental floss between the eyes 4 of the arms 2 and 3 into a taut straight line. Another method threading the tooth cleaner with the dental floss is to fold the dental floss in the middle of its length, forming a partial loop intermediate the ends of the floss, the floss forming this loop is then slipped through the entrance openings into the eyes 4 on each arm and the lengths of the floss are drawn tautly along the arms 2 and 3 and have their ends wound about the thumb and finger grip 5 to hold the floss tightly in position.

While in the drawings and the foregoing description, the tooth cleaner is illustrated as being formed of a length of metal wire shaped to form the parts of the tooth cleaner and a metal stabilizing or steadying plate is attached to them, it is to be understood that the tooth cleaner may be made of any suitable material, such as metal or plastic, machined, cast or otherwise formed to provide the dental floss holding tooth cleaner without departing from the spirit of the present invention, all as covered by the appended claims.

What is claimed is:

1. A tooth cleaner comprising a pair of spaced arms, dental floss restraining means on one end of each arm and arranged in spaced alignment with each other, a thumb and finger grip element attached to the ends of the arms remote from said dental floss restraining means, a skirt cooperating with said thumb and finger grip to tightly hold the ends of a length of dental floss so that a taut straight length of dental floss may be maintained between the dental floss restraining means.

2. A tooth cleaner as claimed in claim 1, including stabilizing means for holding said arms rigidly in position relative to each other.

3. A tooth cleaner as claimed in claim 1, including a guide hook for guiding the ends of a length of dental floss into tightening position with respect to said thumb and finger grip and said skirt.

4. A tooth cleaner as claimed in claim 1, wherein said dental floss restraining means on the ends of the arms comprise formed eyes having entrance opening slits formed in their perimeter to permit the entrance of the dental floss into the eyes.

5. A tooth cleaner as claimed in claim 1, wherein said thumb and finger grip is substantially circular in cross section and is disposed relative to said skirt so that dental floss passed downwardly over the perimeter of the thumb and finger grip towards the skirt will be tightly gripped between the skirt and the surface of the thumb and finger grip.

6. A tooth cleaner comprising a pair of spaced arms, as claimed in claim 1, wherein said skirt includes means to engage said arms to stabilize the arms and rigidly hold them in their proper positions.

* * * * *